US010304449B2

(12) United States Patent
Konuma

(10) Patent No.: US 10,304,449 B2
(45) Date of Patent: May 28, 2019

(54) SPEECH RECOGNITION USING REJECT INFORMATION

(71) Applicant: Panasonic Intellectual Property Management Co., Ltd., Osaka (JP)

(72) Inventor: Tomohiro Konuma, Osaka (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 0 days.

(21) Appl. No.: 15/557,862

(22) PCT Filed: Mar. 16, 2016

(86) PCT No.: PCT/JP2016/001496
§ 371 (c)(1),
(2) Date: Sep. 13, 2017

(87) PCT Pub. No.: WO2016/157782
PCT Pub. Date: Oct. 6, 2016

(65) Prior Publication Data
US 2018/0053506 A1  Feb. 22, 2018

(30) Foreign Application Priority Data

Mar. 27, 2015  (JP) .................................. 2015-067513

(51) Int. Cl.
*G10L 15/00* (2013.01)
*G10L 15/22* (2006.01)
(Continued)

(52) U.S. Cl.
CPC .............. *G10L 15/22* (2013.01); *G10L 15/06* (2013.01); *G10L 15/08* (2013.01); *G10L 15/10* (2013.01);
(Continued)

(58) Field of Classification Search
USPC .................................. 704/231–257, 270–275
See application file for complete search history.

(56) References Cited

U.S. PATENT DOCUMENTS 5,577,164 A     11/1996  Kaneko et al.
5,930,751 A  *  7/1999  Cohrs ..................... G10L 15/22
                                                              704/231
(Continued)

FOREIGN PATENT DOCUMENTS

JP   1-158498   6/1989
JP   7-077998   3/1995
JP   7-219588   8/1995

OTHER PUBLICATIONS

International Search Report of PCT application No. PCT/JP2016/001496 dated May 31, 2016.
(Continued)

*Primary Examiner* — Jesse S Pullias
(74) *Attorney, Agent, or Firm* — McDermott Will & Emery LLP

(57) ABSTRACT

A voice recognition device includes a storage, a voice recognizer, and a reject information generator. The storage stores reject information for use in specifying a voice. The voice recognizer recognizes an input voice as a target word while defining, as one of conditions, a fact that a degree of likelihood between a voice specified by the reject information and the input voice is lower than a predetermined threshold value. In case where the voice recognizer has recognized the input voice as the target word in a predetermined state, the reject information generator determines the reject information, based on the input voice, and stores the reject information in the storage.

12 Claims, 8 Drawing Sheets

(51) Int. Cl.
  *G10L 15/06*  (2013.01)
  *G10L 15/08*  (2006.01)
  *G10L 15/10*  (2006.01)
  *G10L 15/32*  (2013.01)
  *H04N 21/422*  (2011.01)

(52) U.S. Cl.
  CPC ....... *G10L 15/32* (2013.01); *H04N 21/42203* (2013.01); *H04N 21/42204* (2013.01); *G10L 2015/088* (2013.01)

(56) References Cited

U.S. PATENT DOCUMENTS

| | | | | |
|---|---|---|---|---|
| 6,985,865 | B1* | 1/2006 | Packingham | G10L 15/22 704/275 |
| 8,340,975 | B1* | 12/2012 | Rosenberger | G10L 15/22 704/270 |
| 2002/0128847 | A1* | 9/2002 | Ancona | G10L 15/26 704/275 |
| 2002/0167392 | A1* | 11/2002 | Williams | H04L 51/24 340/3.3 |
| 2006/0282268 | A1* | 12/2006 | Huang | G10L 15/26 704/275 |
| 2007/0043561 | A1* | 2/2007 | Helbing | G10L 15/08 704/231 |
| 2012/0239402 | A1* | 9/2012 | Washio | G10L 15/02 704/251 |
| 2013/0289987 | A1 | 10/2013 | Ganapathiraju et al. | |

OTHER PUBLICATIONS

The Extended European Search Report dated Feb. 16, 2018 for the related European Patent Application No. 16771676.0.

* cited by examiner

FIG. 3

Recognition-use information

| Target word | Acoustic feature information |
|---|---|
| Power on | (Acoustic feature of power on) |
| Microphone on | (Acoustic feature of microphone on) |
| ⋮ | ⋮ |

FIG. 4

Reject information list

| Reject information | | |
|---|---|---|
| Target word | Reject word | Acoustic feature information of reject word |
| Power on | xxxx | (Acoustic feature of xxxx) |
| Power on | yyyy | (Acoustic feature of yyyy) |

SPEECH RECOGNITION USING REJECT INFORMATION

This application is a U.S. national stage application of the PCT International Application No. PCT/JP2016/001496 filed on Mar. 16, 2016, which claims the benefit of foreign priority of Japanese patent application 2015-067513 filed on Mar. 27, 2015, the contents all of which are incorporated herein by reference.

TECHNICAL FIELD

The present disclosure relates to a voice recognition system, a voice recognition device, a voice recognition method, and a control program, which recognize a voice uttered by a user.

BACKGROUND ART

There is disclosed a technology for performing voice recognition by using a dictionary that registers therein acoustic feature values of words to be matched with input voices.

Patent Literature 1 discloses a technology regarding the voice recognition. In the technology disclosed in Patent Literature 1, in the dictionary, there are registered acoustic feature values of words to be recognized and acoustic feature values of words (unnecessary words) other than the words to be recognized. Then, the unnecessary words are removed from a plurality of the words recognized by the voice recognition.

CITATION LIST

Patent Literature

PTL 1: Unexamined Japanese Patent Publication No. H07-77998

SUMMARY

The present disclosure provides a voice recognition device, a voice recognition system, a voice recognition method, and a control program, which determine reject information for specifying a voice misrecognized as a word to be subjected to the voice recognition (hereinafter, this word is referred to as a "target word"), and use the reject information for the voice recognition.

The voice recognition device in the present disclosure is a voice recognition device that recognizes an input voice as a target word. The voice recognition device includes a storage, a voice recognizer, and a reject information generator. The storage stores reject information for use in specifying a voice. The voice recognizer recognizes an input voice as a target word while defining, as one of conditions, a fact that a degree of likelihood between a voice specified by the reject information and the input voice is lower than a predetermined threshold value. In a case where the voice recognizer has recognized the input voice as the target word in a predetermined state, the reject information generator determines the reject information based on the input voice, and stores the reject information in the storage.

The voice recognition system in the present disclosure includes: a first voice recognition device that recognizes an input voice as a target word; and a second voice recognition device that recognizes a word corresponding to the input voice. The first voice recognition device includes a storage, a first voice recognizer, and a reject information generator. The storage stores reject information for use in specifying a voice. The first voice recognizer recognizes the input voice as the target word while defining, as one of the conditions, a fact that a degree of likelihood between the voice specified by the reject information and the input voice is lower than a predetermined threshold value. In a case where the first voice recognizer has recognized the input voice as the target word in a predetermined state, the reject information generator transmits the input voice to the second voice recognition device, receives information, which is related to a voice representing a word recognized based on the input voice by the second voice recognition device, from the second voice recognition device, determines the received information as the reject information, and stores the determined reject information in the storage. The second voice recognition device includes a second voice recognizer. The second voice recognizer recognizes a word, which corresponds to the input voice, based on the input voice received from the first voice recognition device, and transmits the word to the first voice recognition device.

The voice recognition method in the present disclosure is a voice recognition method for use in a voice recognition device. The voice recognition device includes a storage and a voice recognizer. The storage stores reject information for use in specifying a voice. The voice recognizer recognizes an input voice as a target word while defining, as one of conditions, a fact that a degree of likelihood between a voice specified by the reject information and the input voice is lower than a predetermined threshold value. The voice recognition method includes: determining whether or not a voice recognizer has recognized that the input voice is the target word in a predetermined state where the target word should not be recognized; and determining reject information based on the input voice in a case where it is determined that the voice recognizer has recognized that the input voice is the target word in the predetermined state, and storing the reject information in the storage.

The control program in the present disclosure is a control program for allowing a processor of the voice recognition device to execute the voice recognition processing. The voice recognition device includes a storage and a voice recognizer. The storage stores reject information for use in specifying a voice. The voice recognizer recognizes an input voice as a target word while defining, as one of conditions, a fact that a degree of likelihood between a voice specified by the reject information and the input voice is lower than a predetermined threshold value. The voice recognition processing includes: determining whether or not a voice recognizer has recognized that the input voice is the target word in a predetermined state where the target word should not be recognized; and determining reject information based on the input voice in a case where it is determined that the voice recognizer has recognized that the input voice is the target word in the predetermined state, and storing the reject information in the storage.

The voice recognition device, the voice recognition system, the voice recognition method, and the control program in the present disclosure can determine the reject information for use in the voice recognition by themselves.

BRIEF DESCRIPTION OF DRAWINGS

FIG. 3 is a diagram schematically showing a configuration example and content example of recognition-use information in the first exemplary embodiment.

FIG. 4 is a diagram schematically showing a configuration example of a reject information list in the first exemplary embodiment.

DESCRIPTION OF EMBODIMENTS

Figure 1:
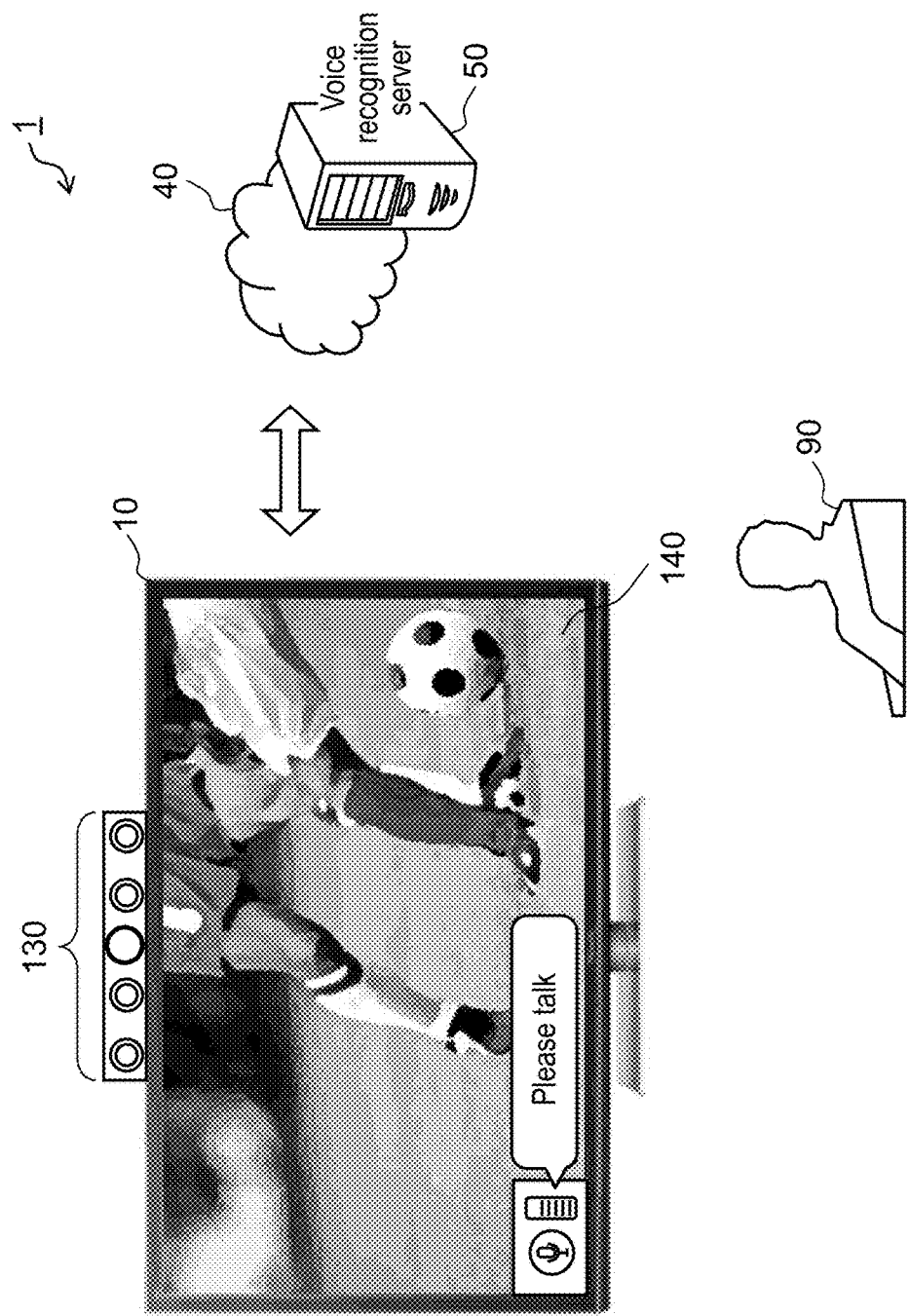
FIG. 1 is a schematic diagram of a voice recognition system in a first exemplary embodiment.

A description is made below in detail of embodiments while referring to the drawings as appropriate. However, a description more in detail than necessary is omitted in some cases. For example, a detailed description of well-known items and a duplicate description of substantially the same configurations are omitted in some cases. Omission of these is made in order to avoid unnecessary redundancy of the following description and to facilitate the understanding of those skilled in the art.

Note that the accompanying drawings and the following description are provided in order to allow those skilled in the art to fully understand the present disclosure, and it is not intended to limit the subject of the description to the scope of claims.

That is to say, numeric values, shapes, constituents, arrangement and connection mode of the constituents, and steps and an order of the steps, which are shown in the description using the following specific examples, are merely examples, and do not limit the subject of the description to the scope of claims. Among the constituents in the following exemplary embodiments, constituents which are not described in independent claims are arbitrarily addable constituents.

Moreover, drawings are schematic diagrams, and are not illustrated necessarily exactly. Furthermore, in the drawings, in some cases, the same reference numerals are assigned to the same constituents, and a description thereof is omitted or simplified.

First Exemplary Embodiment

In a first exemplary embodiment, a description is mainly made of voice recognition system 1 including a voice recognition device. The voice recognition device can determine reject information based on a voice uttered by user 90 (hereinafter, the voice is referred to as an "input voice"). The reject information is information for preventing misrecognition of one or more recognition target words determined by a dictionary for voice recognition.

A description is made of the first exemplary embodiment with reference to FIG. 1 to FIG. 9. Television receiver 10 shown in the first exemplary embodiment has a voice recognition function, and user 90 can perform an operation for television receiver 10 by a voice (hereinafter, this operation is referred to as a "voice operation").

[1-1. Configuration]

FIG. 1 is a schematic diagram of voice recognition system 1 in the first exemplary embodiment.

FIG. 1 shows user 90 of television receiver 10 in addition to voice recognition system 1 including television receiver 10.

As shown in FIG. 1, voice recognition system 1 includes television receiver 10, voice recognition server 50, and a network 40 that communicably connects television receiver 10 and voice recognition server 50 to each other. Network 40 includes a wide area network, for example, such as the Internet.

Television receiver 10 includes a processor, a memory, a storage medium such as a hard disk device, a broadcast receiver circuit, a communication interface, and the like. Moreover, television receiver 10 includes microphone 130 and display 140 as user interfaces.

For display 140, for example, a liquid crystal display, a plasma display, an organic EL (Electro Luminescence) display or the like can be used. In response to the user operation, television receiver 10 receives a television broadcast through a broadcast wave or a communication channel such as a communication cable, and displays a video and the like of a received broadcast program on display 140.

Microphone 130 can collect the voice uttered by user 90 facing to display 140. Television receiver 10 acquires the voice (input voice), which is uttered by user 90, through microphone 130. Then, television receiver 10 has such a voice recognition function that enables recognition of a word based on the input voice.

In television receiver 10, the input voice is processed as a signal or data, which represents a voice.

User 90 can operate television receiver 10 by a remote controller (not shown) and the like. Moreover, the user utters a word toward display 140, and can thereby input the voice to television receiver 10. In this exemplary embodiment, a description is made of operations of television receiver 10 when the user inputs the voice to television receiver 10.

For example, the word includes phrases, which are composed of one or plurality of words in a variety of languages such as Japanese and English.

Voice recognition server 50 is a computer, which includes a processor, a memory, a storage medium such as a hard disk device, a communication interface, and the like, and has the voice recognition function. In voice recognition system 1, voice recognition server 50 provides a voice recognition service and the like.

For example, the voice recognition service is a service of receiving the input voice transmitted through the network, performing the voice recognition based on the received input voice, and returning information related to a voice representing the word, which is subjected to the voice recognition (for example, the word and an acoustic feature of this word, and the like), to a transmission source of the input voice.

In the example shown in FIG. 1, television receiver 10 transmits the input voice to voice recognition server 50 through network 40. Hence, the above-mentioned transmission source of the input voice is television receiver 10 in the example shown in FIG. 1.

FIG. 1 shows only one television receiver 10. However, for example, it is possible to configure voice recognition system 1 such that a plurality of television receivers 10 placed in a plurality of houses can communicate with one voice recognition server 50. Moreover, for example, it is also possible to set a number of target words, which are determined by the voice recognition function of voice recognition server 50, larger than a number of recognition target words (hereinafter, referred to as "target words"), which are determined by the voice recognition function owned by television receiver 10. Note that the number of target words is related to a data volume of the dictionary for the voice recognition.

Voice recognition server 50 has a dictionary including pluralities (for example, a hundred thousand or more) of words corresponding to plural types (for example, twenty plus types) languages, and recognizes some words for the input voice. Moreover, voice recognition server 50 has a function to receive the reject information from television receiver 10. The reject information is information determined by the voice recognition function, which is owned by television receiver 10, based on the input voice in television receiver 10.

Each of the communication interface provided in television receiver 10 and the communication interface provided in voice recognition server 50 is a communication circuit or the like for transmitting/receiving information to/from other devices through network 40. Moreover, each of the above-mentioned memories is a ROM (Read Only Memory), a RAM (Random Access Memory) or the like, and may include a nonvolatile memory. In these memories, there may be prestored a control program for realizing processing of functional constituents to be described later, setting values for use in the control program, and the like. Moreover, the memories may be used for temporarily storing respective values (parameters and the like) for use in an event where the processors execute the control program.

A description is made below of devices which compose voice recognition system 1 mentioned above.

Figure 2:
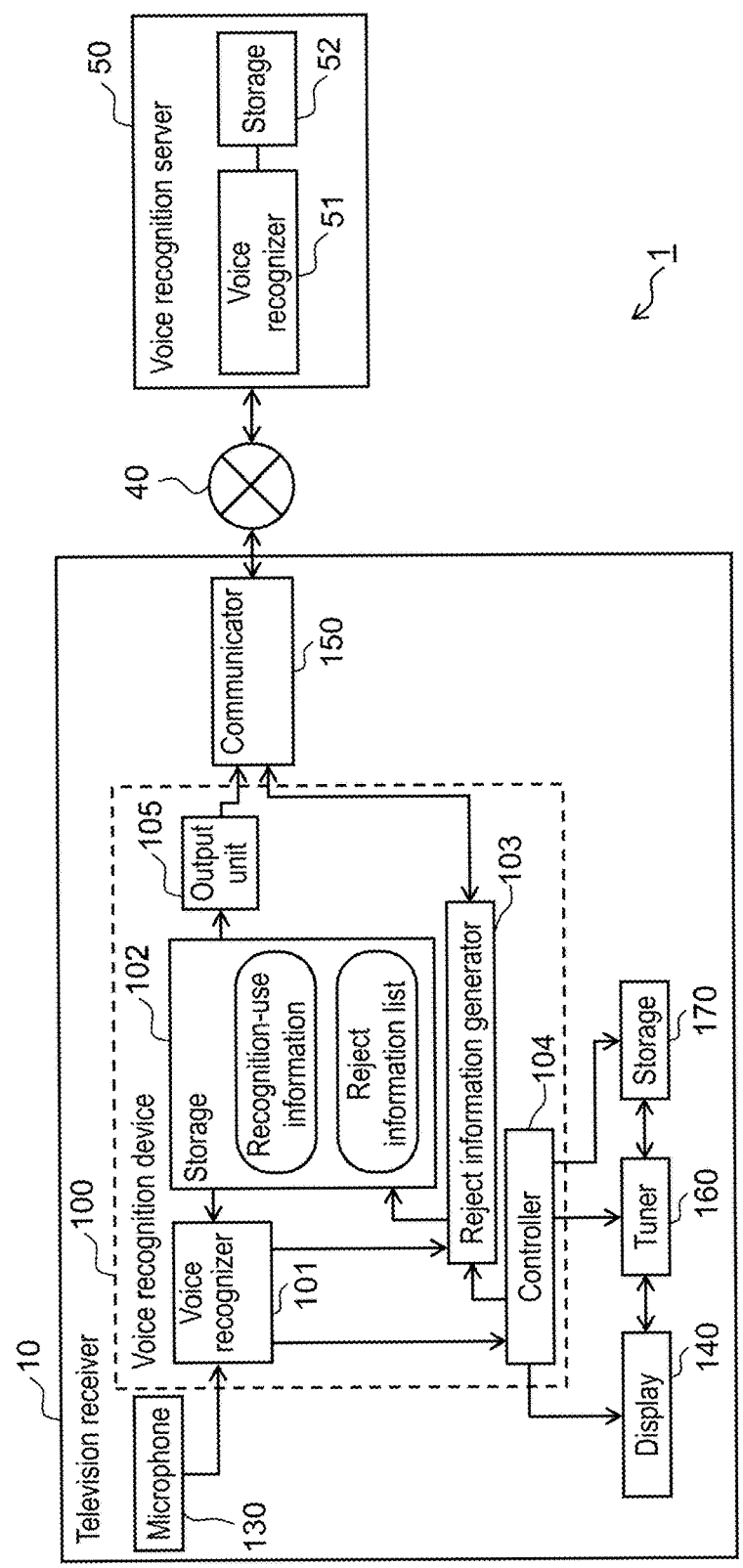
FIG. 2 is a block diagram schematically showing one configuration example of the voice recognition system in the first exemplary embodiment.

FIG. 2 is a block diagram schematically showing one configuration example of voice recognition system 1 in the first exemplary embodiment. FIG. 2 mainly shows functional configurations of voice recognition device 100 of television receiver 10 and voice recognition server 50, television receiver 10 and voice recognition server 50 configuring voice recognition system 1.

As shown in FIG. 2, television receiver 10 includes voice recognition device 100, microphone 130, display 140, communicator 150, tuner 160, and storage 170. Note that television receiver 10 has a function to reduce a power consumption and to be on standby of stopping a supply of power to display 140 when user 90 does not use television receiver 10.

Note that, in FIG. 2, among a plurality of constituents provided in television receiver 10, only constituents related to this exemplary embodiment are shown, and other constituents (for example, a power supply and the like) are omitted.

Communicator 150 is an example of the communication interface. Communicator 150 communicates with voice recognition server 50 through network 40.

Tuner 160 is a broadcast signal receiving circuit. Tuner 160 receives a broadcast signal of a television broadcast, which is transmitted through the broadcast wave, the communication cable, or the like.

Storage 170 is an area of the storage medium such as a memory and a hard disk device. Storage 170 stores information for use in controlling each of units of television receiver 10, a program for controlling each of the units, and the like.

Voice recognition device 100 is in charge of the voice recognition function. Voice recognition device 100 is realized by the processor that executes the control program stored in the memory, by the memory, and by the like. As shown in FIG. 2, voice recognition device 100 includes, as the functional constituents, voice recognizer 101, storage 102, reject information generator 103, controller 104, and output unit 105.

Storage 102 is realized by an area of the storage medium such as a memory and a hard disk device. Storage 102 stores recognition-use information that determines the target words as the dictionary for the voice recognition. Storage 102 has an area for storing the reject information for use in preventing the misrecognition of the target words. Note that storage 102 and storage 170 may be realized by storage mediums different from each other, or may be realized as areas, which are different from each other, of same storage medium.

Next, a description is made of the recognition-use information with reference to FIG. 3, and is made of a reject information list with reference to FIG. 4.

FIG. 3 is a diagram schematically showing a configuration example and content example of the recognition-use information in the first exemplary embodiment.

As shown in FIG. 3, the recognition-use information is information in which each of the target words to be recognized and acoustic feature information, which indicates an acoustic feature of a voice that represents the target word, are associated with each other. For example, the acoustic feature information is a symbol string composed of phoneme labels expressed, for example, by a statistical mode (HMM: Hidden Markov Model) and the like.

The targets words in the recognition-use information, which are stored in storage 102, include, for example, words which represent commands for controlling television receiver 10. FIG. 3 illustrates a word that is "Power On". "Power On" represents a command for activating a power-on function of television receiver 10. For example, the power-on function is a function to start the supply of power to display 140 and the like in television receiver 10. Moreover, FIG. 3 illustrates a word that is "Microphone On". "Microphone On" is a word that serves as a trigger at a time of starting reception of the voice input (that is, voice reception), and is a command for activating a voice reception function in voice recognition device 100.

FIG. 4 is a diagram schematically showing a configuration example of a reject information list in the first exemplary embodiment.

The reject information list is an aggregate of one or more pieces of the reject information stored in storage 102. As shown in FIG. 4, the reject information is information in which the target word, a reject word, and acoustic feature information of the reject word are associated with one another. The reject word is a word, which resembles such a target word that corresponds to the reject word in an acoustic feature in a case of being uttered (spoken), and has a possibility to be misrecognized as the target word in a case where the voice recognition is performed by using only the recognition-use information.

Voice recognizer 101 is realized by a processor that executes the control program and the like. Voice recognizer 101 has a function to perform the voice recognition for the input voice collected through microphone 130. Voice recognizer 101 specifies the target word, which corresponds to the input voice collected through microphone 130, based on such a voice recognition-use dictionary stored in storage 102, and thereby performs the voice recognition.

Specifically, based on the recognition-use information stored in storage 102, voice recognizer 101 compares an acoustic feature for specifying the voice of the target word and an acoustic feature of the input voice with each other, then determines a degree of likelihood between both of the acoustic features, and thereby performs the voice recognition. As described above, voice recognizer 101 performs the voice recognition based on the degree of likelihood between the voice of the target word and the input voice.

As an example of a determination method of the degree of likelihood, for example, there can be mentioned a method of representing each acoustic feature of the voice of the target word and the input voice by a plurality of numeric value parameters, comparing numeric values of the respective parameters, and determining that the degree of likelihood is higher as the compared numeric values are more approximate to each other. However, the present disclosure does not limit the determination method of the degree of likelihood. Existing methods other than this method may be applied as the determination method of the degree of likelihood.

In a case where a certain target word and a certain input voice resemble each other beyond a predetermined threshold value for determining the degree of likelihood, then voice recognizer 101 may specify the target word as a result of voice recognition for the input voice.

However, in a case where the reject information is stored in storage 102, then voice recognizer 101 calculates a degree of likelihood between the input voice and a voice, which is specified by an acoustic feature of a reject word corresponding to the target word. Then, in a case where this degree of likelihood is lower than the predetermined threshold value, voice recognizer 101 specifies the target word as a result of the voice recognition for the input voice.

In an event of specifying one target word as the result of the voice recognition, voice recognizer 101 specifies a plausibility. The plausibility is an index that represents a plausibleness of the result of the voice recognition. The plausibility is determined based on such results of the comparison and determination, which are performed for the degree of likelihood and the like by voice recognizer 101. For example, the degree of likelihood between the voice represented by the target word and the input voice may be used as an example of the plausibility.

Reject information generator 103 is realized by the processor that executes the control program and the like. Reject information generator 103 has a function to generate the reject information based on the input voice from microphone 130 in a predetermined state, and to store the generated reject information in storage 102. The reject information composes the reject information list. Moreover, this predetermined state refers to, for example, a state where voice recognition device 100 is not waiting for input of the target word. In the state where voice recognition device 100 does not wait for the input of the target word, in usual, in voice recognition device 100, the target word of the input voice should not be recognized from the input voice.

In a case where the voice input is made in the state where voice recognition device 100 does not wait for the input of the target word (that is, the state is the predetermined state), the input voice is voice-recognized to be the target word by voice recognizer 101, and the plausibility as the result of the voice recognition exceeds threshold value S1 to be described later, then reject information generator 103 transmits this input voice to voice recognition server 50 through communicator 150 and network 40. Then, reject information generator 103 receives a word, which is a result of the voice recognition in voice recognition server 50 for the input voice, from voice recognition server 50. Then, reject information generator 103 generates reject information that takes this word as a reject word, and stores the generated reject information in storage 102.

Note that such a state where the input of the target word is not awaited (that is, the state is the predetermined state) may differ for each target word. A specific example is mentioned. For example, if a state of television receiver 10 is in a state where the power-on function is executed and the power supply of television receiver 10 is already turned on, then voice recognition device 100 is not waiting for the input of the target word that is "Power On". Hence, with regard to the target word that is "Power On", the state where the power supply of television receiver 10 is turned on may be taken as the predetermined state.

In this state where the target word that is "Power On" is not awaited (that is, in the predetermined state regarding the target word that is "Power On"), if there is an input voice recognized as "Power On" by voice recognition device 100, then reject information generator 103 transmits this input voice to voice recognition server 50. Then, reject information generator 103 receives a word, which is a result of the voice recognition for this input voice, from voice recognition server 50. Then, reject information generator 103 stores reject information, which takes the received word as the reject word, in storage 102. In the above-mentioned operation example, this reject word is assumed to be not "Power On" but a phrase that is other than "Power On" and sounds similar to "Power On". A reason for the above is that, if television receiver 10 is in a state where the power-on function is already executed (for example, in a state where display 140 is supplied with power and a broadcast program and the like are displayed on display 140), then it can be assumed to be highly possible that user 90 may not perform voice input of a command that is "Power On".

Controller 104 is realized by the processor that executes the control program, and the like. Controller 104 has a function to perform a control corresponding to such a command represented by the target word recognized by voice recognizer 101 (that is, the control is control processing predetermined as an action corresponding to the input voice subjected to the voice recognition). In a case where the command represented by the target word is a command to control each of the units of television receiver 10 (for example, display 140, tuner 160, and the like), controller 104 transmits a control signal corresponding to the command, to each of the units. Note that, in a case where a specific target word (for example, "Power On", "Microphone On" or the like) is recognized in order to perform the control corresponding to the command represented by the target word, controller 104 defines, as a condition, a fact that a plausibility of a result of this voice recognition exceeds threshold value S1, and then performs the control in a case where the condition is satisfied.

Output unit 105 is realized by the processor that executes the control program and the like. Output unit 105 has a function to transmit the reject information list to an external server (for example, voice recognition server 50) through communicator 150 and network 40 in a case where the reject information list (that is, one or more pieces of the reject information) is stored in storage 102.

As shown in FIG. 2, voice recognition server 50 includes voice recognizer 51 and storage 52 as functional constituents.

Note that, in FIG. 2, among a plurality of constituents provided in voice recognition server 50, only constituents related to this exemplary embodiment are shown, and constituents (for example, a processor, a communication interface, a power supply, and the like) generally provided in a server computer are omitted.

Storage 52 has a function to store the dictionary for the voice recognition. For example, storage 52 may be composed of a storage medium such as a hard disk device with a relatively large volume. Storage 52 may store a dictionary with a larger data volume than the data volume of the dictionary for the voice recognition, which is owned by voice recognition device 100.

Voice recognizer 51 has a function to perform the voice recognition, which is based on the input voice received from television receiver 10, by using the dictionary stored in storage 52, to specify the word corresponding to the input voice, and to return the specified word to television receiver 10.

[1-2. Operations]

A description is made below of operations regarding the voice recognition function in voice recognition system 1 including the above-mentioned configuration.

[1-2-1. Voice Input Handling Processing in Voice Recognition Device 100 of Television Receiver 10]

Upon receiving the supply of the power, television receiver 10 first turns to a standby state, and starts voice input handling processing. It is also possible for user 90 to operate television receiver 10 by a remote controller and the like. However, a description is made here of an operation example where user 90 operates television receiver 10 by the voice input (that is, a voice operation).

Figure 5:
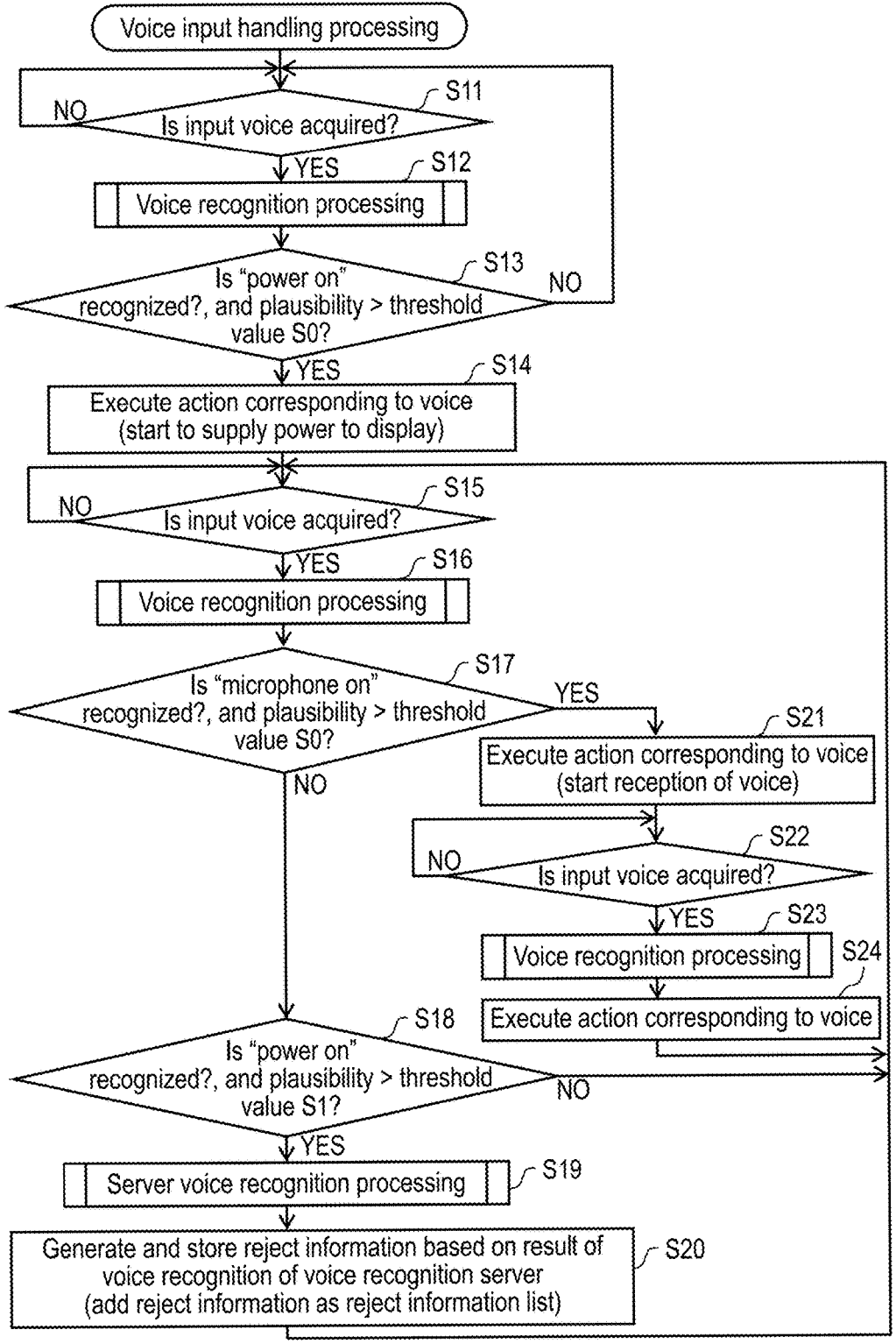
FIG. 5 is a flowchart showing an example of voice input handling processing executed by a voice recognition device in the first exemplary embodiment.

FIG. 5 is a flowchart showing an example of the voice input handling processing executed by voice recognition device 100 in the first exemplary embodiment. A description is made below of operations, which are related to the voice input handling processing of voice recognition device 100, with reference to the flowchart of FIG. 5.

Voice recognition device 100 acquires the voice uttered by user 90 (that is, the input voice) through microphone 130 of television receiver 10 (Step S11).

Voice recognition device 100 is on standby until acquiring the voice uttered by user 90 (that is, the input voice) (NO in Step S11). Such a state is the state of "waiting for the input".

Upon acquiring the voice uttered by user 90 (that is, the input voice) in Step S11 (YES in Step S11), voice recognition device 100 performs voice recognition processing by voice recognizer 101 (Step S12).

Figure 6:
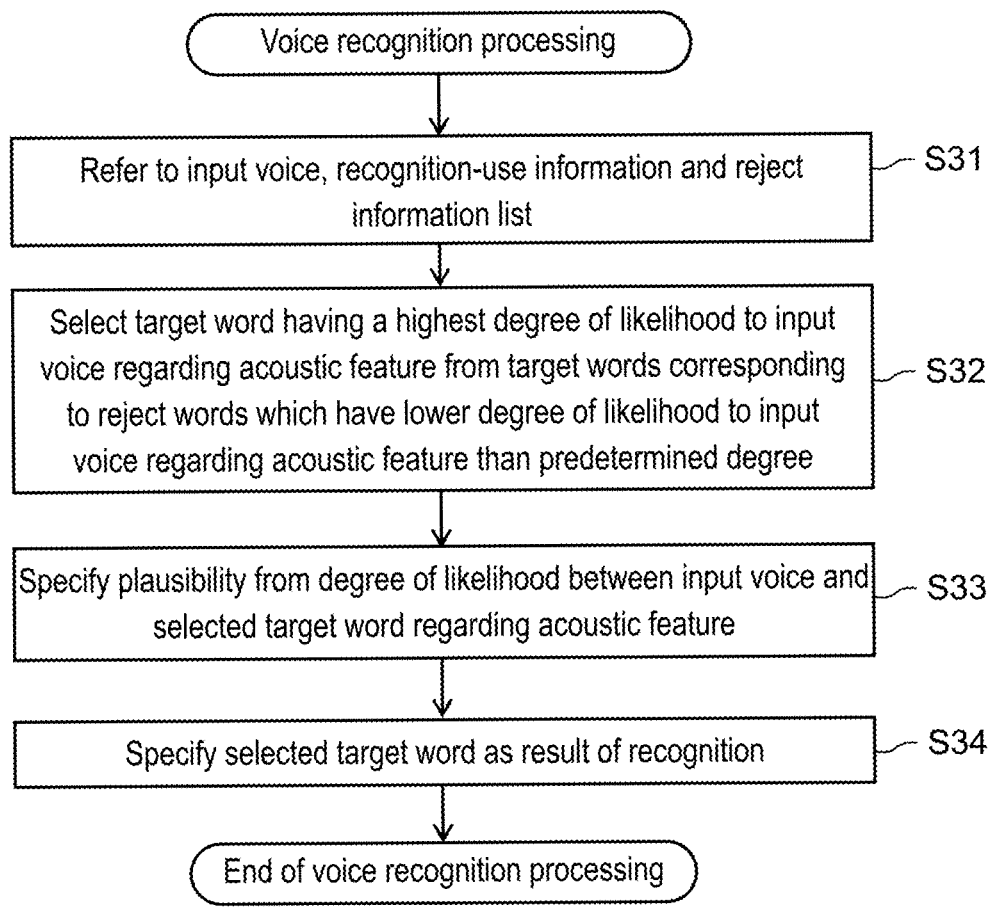
FIG. 6 is a flowchart showing an example of voice recognition processing executed by the voice recognition device in the first exemplary embodiment.

A description is made here of details of the voice recognition processing of Step S12 with reference to FIG. 6.

FIG. 6 is a flowchart showing an example of the voice recognition processing executed by voice recognition device 100 in the first exemplary embodiment.

Voice recognizer 101 refers to the recognition-use information stored in storage 102, and compares the acoustic feature of the input voice and the acoustic features of one or more targets words with each other. Moreover, in a case where the reject information list is stored in storage 102, voice recognizer 101 see the reject information list and compares the acoustic feature of the input voice and the acoustic features of the reject words with each other (Step S31).

Voice recognizer 101 selects reject words having a lower degree of likelihood to the input voice in the acoustic feature than the predetermined threshold value. Then, out of target words corresponding to these reject words, voice recognizer 101 selects a target word having a highest degree of likelihood to the input voice in the acoustic feature (Step S32).

The reject words are used for preventing an occurrence of the misrecognition in voice recognizer 101. In the selection processing for the target word in Step S32, the target word having the highest degree of likelihood to the input voice in the acoustic feature is selected out of the target words of the recognition-use information. However, for this selection, there is set a condition for preventing the target words, which correspond to the reject words having the high degree of likelihood to the input voice, from being selected out of the reject words determined for preventing the misrecognition in response to the targets words.

Voice recognizer 101 specifies the plausibility based on the acoustic feature-related degree of likelihood between the target word selected in Step S32 and the input voice (Step S33).

Voice recognizer 101 specifies the target word, which is selected in Step S32, as a result of the voice recognition (Step S34), and end the voice recognition processing.

Returning to FIG. 5, there continues the description of the voice input handling processing on and after Step S12.

Controller 104 of voice recognition device 100 determines whether or not the result of the voice recognition of voice recognizer 101 in Step S12 is "Power On", and the plausibility specified in Step S33 in Step S12 exceeds threshold value S0 (Step S13).

Threshold value S0 is a numeric value predetermined based on an experiment and the like. With regard to threshold value S0, for example, a case is considered where a user who faces display 140 of television receiver 10 attempts to input a command by voice and clearly utters a target word corresponding to the command (for example, the target word is "Power On", "Microphone On", and the like). Then, a plausibility in this case is determined so as to exceed threshold value S0.

In a case where controller 104 has made a determination of NO in Step S13 (that is, in a case where the result of the voice recognition in Step S12 is not "Power On", or in a case where the plausibility specified in Step S33 in Step S12 is equal to or less than threshold value S0), then voice recognition device 100 returns the processing to Step S11, and is on standby until acquiring the voice uttered by user 90 (that is, the input voice). Hence, the processing of Step S11 to Step S13 here is processing for being on standby for the voice input of the "Power On" command in voice recognition device 100.

In a case where controller 104 has made a determination of YES in Step S13 (that is, in a case where the result of the voice recognition in Step S12 is "Power On", and the plausibility specified in Step S33 in Step S12 exceeds threshold value S0), then controller 104 activates the power-on function as an action corresponding to the input voice, and for example, starts to supply power to display 140 and the like (Step S14).

Voice recognition device 100 acquires the voice uttered by user 90 (that is, the input voice) through microphone 130 of television receiver 10 (Step S15).

Voice recognition device 100 is on standby until acquiring the voice uttered by user 90 (that is, the input voice) (NO in Step S15). That is to say, voice recognition device 100 is in the state of "waiting for the input".

However, since the power-on function is already activated in Step S14, voice recognition device 100 is in a state of not waiting for the input of the voice of the target word that represents the command of "Power On" in Step S15.

Upon acquiring the voice uttered by user 90 (that is, the input voice) in Step S15 (YES in Step S15), voice recognition device 100 performs voice recognition processing by voice recognizer 101 (Step S16). The voice recognition processing in Step S16 is substantially the same as the voice recognition processing of Step S12, which is described with reference to FIG. 6, and accordingly, a detailed description of the voice recognition processing in Step S16 is omitted.

Controller 104 of voice recognition device 100 determines whether or not the result of the voice recognition of voice recognizer 101 in Step S16 is "Microphone On", and the plausibility specified in Step S33 in Step S16 exceeds threshold value S0 (Step S17).

In a case where controller 104 has made a determination of NO in Step S17 (that is, in a case where the result of the voice recognition in Step S16 is not "Microphone On", or in a case where the plausibility specified in Step S33 in Step S16 is equal to or less than threshold value S0), then controller 104 determines whether or not the result of the voice recognition of voice recognizer 101 in Step S16 is "Power On", and the plausibility specified in Step S33 in Step S16 exceeds threshold value S1 (Step S18).

Threshold value S1 is a value set equal to or less than threshold value S0. Threshold value S1 may be equal to threshold value S0. However, it is effective to set threshold value S1 a little lower than threshold value S0 in an event where reject information generator 103 determines the reject information for preventing the misrecognition at the time of the voice recognition in a subsequent step (procedure).

In a case where controller 104 has made a determination of NO in Step S18 (that is, in a case where the result of the voice recognition in Step S16 is not "Power On", or in a case where the plausibility specified in Step S33 in Step S16 is equal to or less than threshold value S1), then voice recognition device 100 returns the processing to Step S15, and is on standby until acquiring the voice uttered by user 90 (that is, the input voice).

In a case where controller 104 has made a determination of YES in Step S18 (that is, in a case where the result of the voice recognition in Step S16 is "Power On", and the plausibility specified in Step S33 in Step S16 exceeds threshold value S1), then reject information generator 103 starts server voice recognition processing (Step S19). The server voice recognition processing is started in such a manner that the input voice used for the voice recognition of voice recognizer 101 is transmitted to voice recognition server 50.

Note that, in a case where controller 104 has made the determination of YES in Step S18, controller 104 does not execute the power-on function since the power-on function is already executed. That is to say, in a case where voice recognizer 101 has recognized that the input voice is the target word in a state that is not the predetermined state, controller 104 executes predetermined control processing, and in a case where voice recognizer 101 has recognized that the input voice is the target word in the predetermined state, then controller 104 does not execute the control processing. Note that the predetermined state in this case is, for example, a state where display 140 is supplied with power. Moreover, the state that is not the predetermined state in this case is, for example, a state where television receiver 10 is on standby. Moreover, the target word in this case is, for example, "Power On". Furthermore, the predetermined control processing in this case is, for example, processing for supplying power to display 140 and the like.

Figure 7:
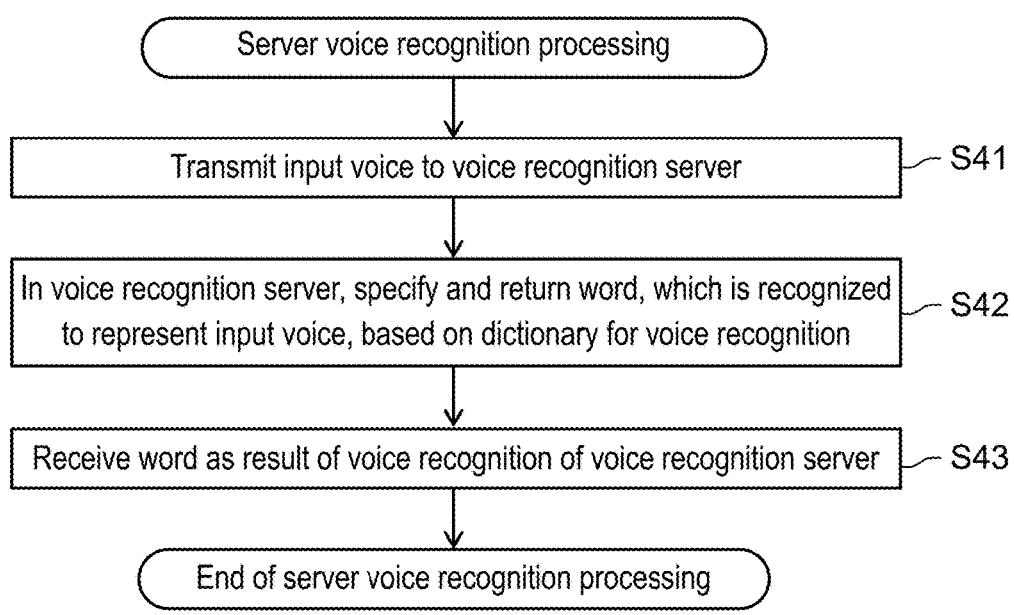
FIG. 7 is a flowchart showing an example of server voice recognition processing executed by the voice recognition system in the first exemplary embodiment.

A description is made here of details of the server voice recognition processing of Step S19 with reference to FIG. 7.

FIG. 7 is a flowchart showing an example of the server voice recognition processing executed by voice recognition system 1 in the first exemplary embodiment. FIG. 7 shows an example of the server voice recognition processing in which reject information generator 103 of television receiver 10 executes in conjunction with voice recognition server 50.

Reject information generator 103 of television receiver 10 transmits the input voice to voice recognition server 50 through communicator 150 and network 40 (Step S41).

Voice recognition server 50 receives the input voice, which is transmitted from television receiver 10, through network 40.

In voice recognition server 50, voice recognizer 51 performs the voice recognition for the input voice based on the dictionary for the voice recognition, which is stored in storage 52, and specifies the word, which represents the input voice, as a result of the voice recognition. Then, voice recognition server 50 transmits the word, which is specified as the result of the voice recognition, and an acoustic feature of the voice, which represents this word, to communicator 150 of television receiver 10 through network 40 (Step S42).

Reject information generator 103 of television receiver 10 receives the word as the result of the voice recognition and information, which is related to the acoustic feature, through network 40 and communicator 150 (Step S43).

Voice recognition device 100 of television receiver 10 executes the server voice recognition processing shown in FIG. 7 in the state of not waiting for the input of the command of "Power On". Therefore, reject information generator 103 receives the word other than "Power On", which has a possibility to be misrecognized as "Power On", and the information, which indicates the acoustic feature of the word, as the result of the voice recognition from voice recognition server 50.

Returning to FIG. 5, there continues the description of the voice input handling processing on and after Step S19.

Reject information generator 103 generates the reject information based on the result of the voice recognition, which is received from voice recognition server 50, and adds the generated reject information to the reject information list in storage 102 (Step S20).

Specifically, reject information generator 103 defines the word and the acoustic feature of the word, which are received from voice recognition server 50, as a reject word and an acoustic feature of the reject word, then generates the reject information (refer to FIG. 4) in which the reject word and the acoustic feature of the reject word are associated with "Power On" that is the target word, and stores the generated reject information in storage 102.

After the reject information is stored in storage 102, with regard to a word in which a degree of likelihood in the acoustic feature to that of the reject word indicated by the reject information is equal to or more than the predetermined threshold value (for example, this word is a word which is very similar to "Power On" but is other than "Power On"), voice recognizer 101 does not adopt a target word (for example, "Power On"), which corresponds to this word (reject word), as the result of the voice recognition when performing the acoustic recognition of the input voice. Hence, in voice recognition system 1, in a case where user 90 utters the reject word, the input voice is prevented from being misrecognized as the target word.

After Step S20, voice recognition device 100 returns the processing to Step S15, and is on standby until acquiring the voice uttered by user 90 (that is, the input voice).

In a case where controller 104 has made a determination of YES in Step S17 (that is, in a case where the result of the voice recognition in Step S16 is "Microphone On", and the plausibility specified in Step S33 in Step S16 exceeds threshold value S0), then controller 104 executes the voice reception function as an action corresponding to the input voice, and starts the reception of the voice (Step S21).

The voice reception function is a function to give user 90 timing when voice recognition device 100 acquires the command and the like after the power-on function is executed by television receiver 10. For example, the word "Microphone On" is a word that serves as a trigger when voice recognition device 100 starts the reception of the voice.

Voice recognition device 100, which has started the reception of the voice, acquires the voice uttered by user 90 (that is, the input voice) through microphone 130 of television receiver 10 (Step S22).

Voice recognition device 100 is on standby until acquiring the voice uttered by user 90 (that is, the input voice) (NO in Step S22). That is to say, voice recognition device 100 is in the state of "waiting for the input".

Upon acquiring the voice uttered by user 90 (that is, the input voice) in Step S22 (YES in Step S22), voice recognition device 100 performs voice recognition processing by voice recognizer 101 (Step S23). The voice recognition processing in Step S23 is substantially the same as the voice recognition processing of Step S12, which is described with reference to FIG. 6, and accordingly, a detailed description of the voice recognition processing in Step S23 is omitted.

Controller 104 of voice recognition device 100 performs the control, which corresponds to the target word recognized from the input voice as the result of the voice recognition processing in Step S23 (Step S24).

In Step S24, controller 104 performs the predetermined control as the action corresponding to the input voice. That is to say, in Step S24, controller 104 transmits the control signal, which serves for controlling each of the units of television receiver 10, to each of the units in response to the command represented by the target word. An example of this control is mentioned. In a case where a target word, which is "Power Off", is recognized by voice recognizer 101 in the voice recognition processing of Step S23, then in Step S24, controller 104 transmits a control signal, which serves for stopping the power supply to display 140, to each of the units. As a result, television receiver 10 turns to the standby state.

After Step S24, voice recognition device 100 returns the processing to Step S15, and is on standby until acquiring the voice uttered by user 90 (that is, the input voice).

[1-2-2. Reject Information Transmission Processing in Voice Recognition Device 100 of Television Receiver 10]

Separately from the above-mentioned voice input handling processing, voice recognition device 100 executes reject information transmission processing.

Figure 8:
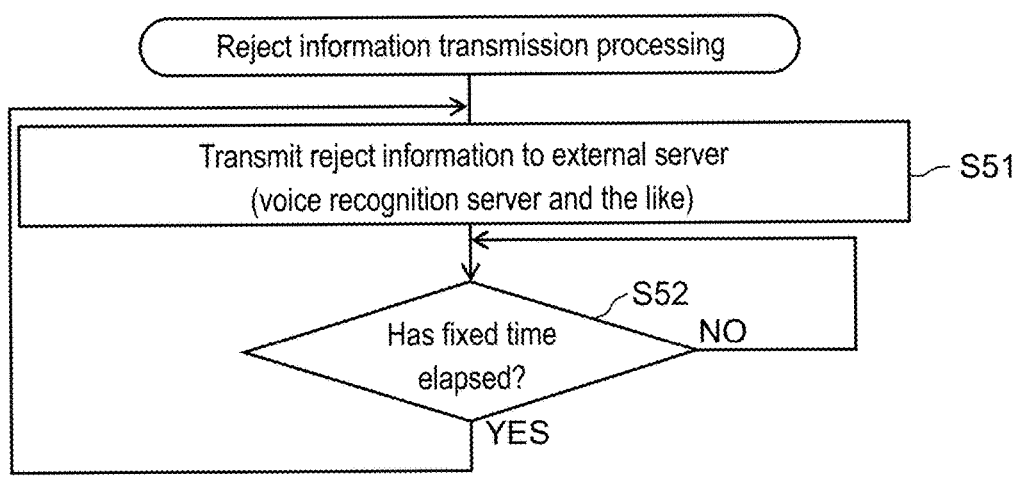
FIG. 8 is a flowchart showing an example of reject information transmission processing executed by the voice recognition device in the first exemplary embodiment.

FIG. 8 is a flowchart showing an example of the reject information transmission processing executed by voice recognition device 100 in the first exemplary embodiment. A description is made below of operations, which are related to the reject information transmission processing of voice recognition device 100, with reference to the flowchart of FIG. 8.

In a case where the reject information is stored in storage 102, output unit 105 of voice recognition device 100 transmits the reject information through communicator 150 and network 40 to the external server (for example, voice recognition server 50) (Step S51).

Output unit 105 determines whether or not a fixed time (for example, one month and the like) has elapsed since the processing of Step S51 was executed (Step S52).

Output unit 105 is on standby until the fixed time (for example, one month and the like) has elapsed since the processing of Step S51 was executed (NO in Step S52).

In a case of having determined that the fixed time (for example, one month and the like) has elapsed since the processing of Step S51 was executed (YES in Step S52), output unit 105 returns the processing to Step S51, and executes the processing of Step S51.

In such a way, in voice recognition system 1, in a case where voice recognition system 1 includes the plurality of television receivers 10, it becomes possible to collect the reject information, which comes from the plurality of television receivers 10, by one external server (for example, voice recognition server 50). In such a way, for example, from television receivers 10 placed individually in the plurality of houses, the reject information, which is information of the word prone to be misrecognized as a certain target word (for example, "Power On"), can be collected. The reject information thus collected can be used for enhancing accuracy of the voice recognition in voice recognition device 100. For example, at a time when television receiver 10 is manufactured, the reject information list based on the reject information thus collected, may be prestored in storage 102 of television receiver 10. Alternatively, the reject information list based on the reject information thus collected may be distributed through network 40 to television receiver 10. A quantity of the reject information is increased, whereby it becomes possible to further enhance the accuracy of the voice recognition in voice recognition device 100.

[1-3. Effects and the Like]

As described above, in this exemplary embodiment, the voice recognition device is a voice recognition device that recognizes the input voice as the target word. The voice recognition device includes a storage, a voice recognizer, and a reject information generator. The storage stores reject information for use in specifying a voice. The voice recognizer recognizes an input voice as a target word while defining, as one of conditions, a fact that a degree of likelihood between a voice specified by the reject information and the input voice is lower than a predetermined threshold value. In a case where the voice recognizer has recognized the input voice as the target word in a predetermined state, the reject information generator determines the reject information based on the input voice, and stores the reject information in the storage.

Note that the target word is a word to be subjected to the voice recognition. Voice recognition device 100 is an example of the voice recognition device. Storage 102 is an example of the storage. Voice recognizer 101 is an example of the voice recognizer. Reject information generator 103 is an example of the reject information generator. The reject information shown in FIG. 4 is an example of the reject information.

For example, in the example shown in the first exemplary embodiment, voice recognition system 1 includes: voice recognition device 100 that recognizes the input voice as the target word (for example, "Power On") under a fixed condition; and voice recognition server 50 that recognizes a word corresponding to the input voice. Voice recognition device 100 includes storage 102, voice recognizer 101, and reject information generator 103. Storage 102 stores the reject information for use in specifying the voice. Voice recognizer 101 recognizes the input voice as the target word while defining, as one of the conditions, the fact that the degree of likelihood between the voice specified by the reject information and the input voice is lower than the predetermined threshold value. In the case where voice recognizer 101 recognizes the input voice as the target word in the predetermined state (for example, the state of not waiting for the input of "Power On"), reject information generator 103 transmits the input voice to voice recognition server 50, receives information, which is related to a voice representing a word recognized based on the input voice by voice recognition server 50, from voice recognition server 50, determines the received information as the reject information, and stores the determined reject information in storage 102. Voice recognition server 50 has voice recognizer 51. Voice recognizer 51 recognizes the word, which corresponds to the input voice, based on the input voice received from voice recognition device 100, and transmits the word to voice recognition device 100.

In such a way, for example, in the example shown in the first exemplary embodiment, voice recognition device 100 can determine the reject information such as the reject word based on the voice uttered by user 90 who uses voice recognition device 100. Therefore, it becomes possible for voice recognition device 100 to reduce the misrecognition of the target word, and to realize highly accurate voice recognition. Moreover, voice recognition device 100 can reduce work required for determining the reject information.

As described above, in voice recognition device 100, the reject information that specifies the voice misrecognized as the target word of the voice recognition can be determined appropriately, and the determined reject information can be used for the voice recognition, and accordingly, the accuracy of the voice recognition is enhanced, and convenience for the user who performs the voice input can be enhanced.

The voice recognition device may further include a controller. In a case where the voice recognizer has recognized that the input voice is the target word in the state that is not the predetermined state, the controller may execute the predetermined control processing, and in a case where the voice recognizer has recognized that the input voice is the target word in the predetermined state, then the controller does not have to execute the control processing.

Note that controller 104 is an example of the controller.

In such a way, for example, in the example shown in the first exemplary embodiment, the reject information for preventing the input voice from being misrecognized as the target word can be appropriately determined based on the voice uttered by user 90 in the state where the control processing is not executed even if the target word is input by voice (for example, in a state where the voice input is unnecessary, or a state where the voice input is invalid).

Based on the input voice, the reject information generator may determine, as the reject information, information related to a voice representing a word recognized without depending on the voice recognizer.

In such a way, for example, as the reject information, there can be determined an acoustic feature or the like, which represents the word recognized based on an input voice by a constituent or an external device, which has other voice recognition function. Therefore, for example, in the example shown in the first exemplary embodiment, a word that is not intentionally uttered as the target word, for example, a word uttered by a dialog, a monolog or the like can be prevented from being misrecognized as the target word by voice recognizer 101 of voice recognition device 100.

The reject information generator may acquire information, which is related to a voice representing a word as a result of allowing the external device to perform the voice recognition that is based on the input voice, from the external device, and may determine the information, which is related to the voice representing the word, as the reject information.

Note that voice recognition server 50 is an example of the external device.

In such a way, for example, in the example shown in the first exemplary embodiment, voice recognition device 100 can determine an acoustic feature or the like, which represents the word recognized based on the input voice by voice recognition server 50, as the reject information. This becomes useful, for example, in a case where a voice recognition mechanism having a feature such as multi-language handling or high recognition accuracy cannot be configured in voice recognition device 100 due to a restriction of a capacity of a storage medium that stores the dictionary for the voice recognition. Voice recognition device 100 can generate the reject information in conjunction with voice recognition server 50 including the voice recognition mechanism as described above.

In a case where the voice recognizer recognizes the input voice as the target word in the predetermined state, the reject information generator may store the reject information in the storage at a time of receiving a predetermined input.

Figure 9:
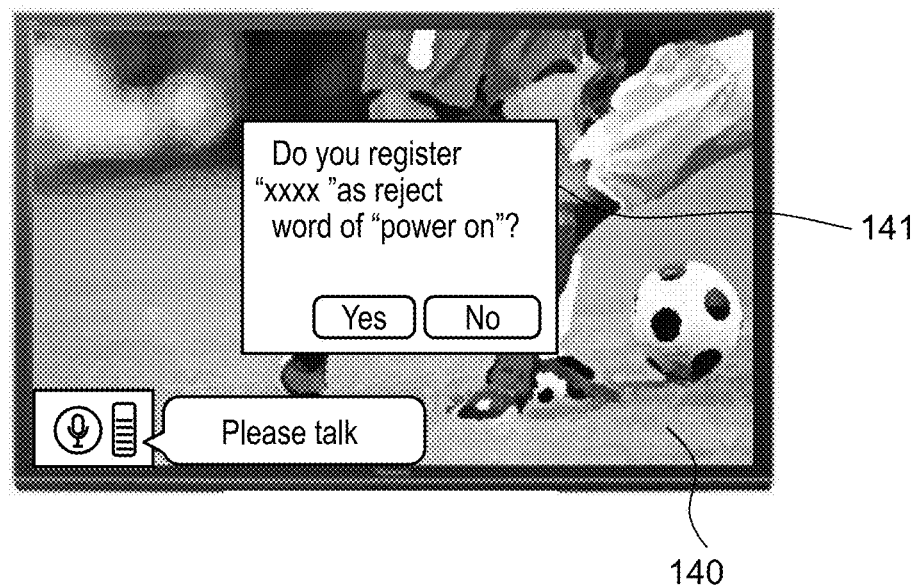
FIG. 9 is a diagram schematically showing an example of a display screen in the first exemplary embodiment.

Note that a display screen shown in FIG. 9 is an example of a reception screen of the predetermined input.

In such a way, for example, in the example shown in the first exemplary embodiment, reject information generator 103 obtains a confirmation of user 90, which is set by the predetermined input, and can thereby determine the reject information as appropriate.

The voice recognition device may be provided in a television receiver including a microphone and a display. The control processing may be processing for supplying power to the display. The predetermined state may be a state where power is supplied to the display.

Note that television receiver 10 is an example of the television receiver. Microphone 130 is an example of the microphone. Display 140 is an example of the display.

In such a way, for example, in the first exemplary embodiment, when television receiver 10 is in the standby state, in an event where user 90 performs the voice input for the command to execute the power-on function to television receiver 10, the reject information prevents an input voice that is not the command to execute the power-on function from misrecognizing as the command to execute the power-on function. Hence, in television receiver 10, the highly accurate voice recognition is enabled. Therefore, in television receiver 10, user 90 is not required to utter the voice, which serves as the trigger to start the voice recognition, prior to the command related to the power-on function, whereby the prevention of the misrecognition can be achieved. Hence, user 90 can rapidly set television receiver 10 to a viewable/audible state.

The voice recognition device may further include a output unit. The output unit may output the reject information, which is stored in the storage, to an outside.

Note that output unit 105 is an example of the output unit.

In such a way, for example, in the first exemplary embodiment, the reject information generated based on the voice uttered by user 90 who uses voice recognition device 100 (that is, the voice is the input voice) can be acquired in voice recognition server 50 placed on the outside. In such a way, for example, the reject information acquired in voice recognition server 50 can be used for further accuracy enhancement of the voice recognition device, manufacturing of the voice recognition mechanism.

In the voice recognition device, such a state where the input of the target word is not awaited or such a state where the target word should not be recognized may be defined as the predetermined state.

In a case where the voice recognition device is provided in the television receiver including the microphone and the display, and the target word is a word representing an instruction to supply power to the display, such a state where power is supplied to the display may be defined as the predetermined state.

Note that the target word that is "Power On" is an example of the word representing the instruction to supply power to the display.

For example, in the operation example shown in the first exemplary embodiment, if television receiver 10 is in the state where the power-on function is already executed (that is, in the state where display 140 is supplied with power and a broadcast program and the like are displayed on display 140), then it is highly possible that user 90 does not perform the voice input of the command that is "Power On". Hence, if there is an input voice recognized as "Power On" by voice recognition device 100 in this state, then it is highly possible that a word brought by this input voice is not be "Power On" but is a word, which is other than "Power On" and resembles "Power On" in terms of sound. Hence, the predetermined state regarding the target word that is "Power On" is set to the state where the target word that is "Power On" is not awaited, that is, the state where display 140 is supplied with power, whereby voice recognition device 100 can determine the word, which is other than "Power On" and resembles "Power On" in terms of sound, as the reject word by using voice recognition server 50. Then, voice recognition device 100 stores the reject information, in which this word is taken as the reject word, in storage 102, and can thereby further enhance the accuracy of the voice recognition.

In this exemplary embodiment, the voice recognition system includes: a first voice recognition device that recognizes the input voice as the target word; and a second voice recognition device that recognizes the word corresponding to the input voice. The first voice recognition device includes a storage, a first voice recognizer, and a reject information generator. The storage stores reject information for use in specifying a voice. The first voice recognizer recognizes the input voice as the target word while defining, as one of the conditions, a fact that a degree of likelihood between the voice specified by the reject information and the input voice is lower than a predetermined threshold value. In a case where the first voice recognizer has recognized the input voice as the target word in a predetermined state, the reject information generator transmits the input voice to the second voice recognition device, receives information, which is related to a voice representing a word recognized based on the input voice by the second voice recognition device, from the second voice recognition device, determines the received information as the reject information, and stores the determined reject information in the storage. The second voice recognition device includes a second voice recognizer. The second voice recognizer recognizes a word, which corresponds to the input voice, based on the input voice received from the first voice recognition device, and transmits the word to the first voice recognition device.

Note that voice recognition system 1 is an example of the voice recognition system. Voice recognition device 100 is an example of the first voice recognition device. Voice recognition server 50 is an example of the second voice recognition device. Voice recognizer 101 is an example of the first voice recognizer. Voice recognizer 51 is an example of the second voice recognizer.

This voice recognition system has two lines of voice recognition systems. The second voice recognition device may be configured without being limited by the restriction inherent in the first voice recognition device (for example, the restriction that it is difficult to provide a large-capacity storage medium, and so on). For example, in the second voice recognition device, a dictionary for the voice recognition may be composed of a storage medium having a larger capacity than a storage medium in the first voice recognition device.

Then, in this voice recognition system, by using the second voice recognition device, the first voice recognition system may allow the second voice recognition device to execute the voice recognition based on the input voice, which is input to the first voice recognition device. In such a way, the first voice recognition device can determine the reject information such as the reject word by fully using a result of voice recognition with higher accuracy in the second voice recognition device, and accordingly, can perform voice recognition with higher accuracy.

For example, in the example shown in the first exemplary embodiment, voice recognition server 50 can have such a dictionary for the voice recognition, which is larger in capacity than the dictionary for the voice recognition, which is owned by voice recognition device 100. Then, in voice recognition system 1, it is possible for voice recognition device 100 to allow voice recognition server 50 to execute the voice recognition based on the input voice, which is input to voice recognition device 100 by using voice recognition server 50. Hence, voice recognition device 100 can determine the reject information such as the reject word by using a result of voice recognition with higher accuracy in voice recognition server 50, and accordingly, can perform voice recognition with higher accuracy.

As described above, in voice recognition system 1, the reject information that specifies the voice misrecognized as the target word of the voice recognition can be determined appropriately, and the determined reject information can be used for the voice recognition, and accordingly, the accuracy of the voice recognition is enhanced, and convenience for the user who performs the voice input can be enhanced.

In this embodiment, a voice recognition method is a voice recognition method for use in a voice recognition device. The voice recognition device includes a storage and a voice recognizer. The storage stores reject information for use in specifying a voice. The voice recognizer recognizes an input voice as a target word while defining, as one of conditions, a fact that a degree of likelihood between a voice specified by the reject information and the input voice is lower than a predetermined threshold value. The voice recognition method includes: a step of determining whether or not a voice recognizer has recognized that the input voice is the target word in a predetermined state where the target word should not be recognized; and a step of determining reject information based on the input voice in a case where it is determined that the voice recognizer has recognized that the input voice is the target word in the predetermined state, and storing the reject information in the storage.

In such a way, in the example shown in the first exemplary embodiment, voice recognition device 100 can determine the reject information appropriately based on the voice uttered by user 90 who uses voice recognition device 100. Hence, it becomes possible for voice recognition device 100 to perform the voice recognition with higher accuracy.

Moreover, in this exemplary embodiment, a control program is a control program for allowing the processor of the voice recognition device to execute the voice recognition processing. The voice recognition device includes a storage and a voice recognizer. The storage stores reject information for use in specifying a voice. The voice recognizer recognizes an input voice as a target word while defining, as one of conditions, a fact that a degree of likelihood between a voice specified by the reject information and the input voice is lower than a predetermined threshold value. The voice recognition processing includes: a step of determining whether or not a voice recognizer has recognized that the input voice is the target word in a predetermined state where the target word should not be recognized; and a step of determining reject information based on the input voice in a case where it is determined that the voice recognizer has recognized that the input voice is the target word in the predetermined state, and storing the reject information in the storage.

In such a way, the voice recognition device in which this control program is executed can determine the reject information appropriately based on the voice uttered by the user who uses the voice recognition device.

For example, in the example shown in the first exemplary embodiment, voice recognition device 100 in which this control program is executed can determine the reject information appropriately based on the voice uttered by user 90 who uses voice recognition device 100. Hence, it becomes possible for voice recognition device 100 to perform the voice recognition with higher accuracy.

Note that a variety of these comprehensive or specific aspects include one or plurality of combinations of a device, a system, a method, an integrated circuit, a computer program, and recording medium that is readable by a computer.

Other Exemplary Embodiment

As described above, the description has been made of the first exemplary embodiment as illustration of the technology disclosed in the present application. However, the technology in the present disclosure is not limited to this, and is applicable also to exemplary embodiments subjected to modification, substitution, addition, omission and the like. Moreover, it is also possible to form a new exemplary embodiment by combining the constituents described in the foregoing first exemplary embodiment with one another.

Accordingly, other exemplary embodiment is illustrated below.

In the first exemplary embodiment, the description has been made of the configuration example where voice recognition device 100 has the function to control each of the units of television receiver 10. However, voice recognition device 100 does not have to have the function to control each of the units of television receiver 10. Voice recognition device 100 may be a component that outputs a result of the voice recognition at a time when the input voice is given, the component is included in television receiver 10 or other devices.

In the first exemplary embodiment, the configuration example in which voice recognition device 100 is provided in television receiver 10 has been shown. However, the present disclosure is not limited to this configuration example. For example, voice recognition device 100 may be provided in a variety of devices (for example, a variety of input devices, home electrical appliances, information terminals, robots, on-vehicle devices, vehicles and the like) to which a voice input interface is applicable. Alternatively, voice recognition device 100 may include a variety of function units of a reception function of a television broadcast, a display function of a video, a voice synthesizing function, a moving function and the like.

Voice recognition server 50 shown in the first exemplary embodiment does not have to be placed at a place remote from voice recognition device 100. For example, voice recognition server 50 may be placed in a facility in which voice recognition device 100 is placed, and may be connected to voice recognition device 100 through a LAN (Local Area Network). Alternatively, voice recognition server 50 may be provided in the device (for example, a television receiver) including voice recognition device 100. Moreover, a number of the words, which can be subjected to the voice recognition by voice recognition server 50, does not have to be larger a number of the words, which can be subjected to the voice recognition by voice recognizer 101.

Every time of acquiring the input voice, voice recognition device 100 may transmit the input voice to voice recognition server 50, may receive the result of the voice recognition from voice recognition server 50, and may use the received result of the voice recognition. For example, in a case where the input voice has not corresponded to any target word as the result of the voice recognition in voice recognizer 101, voice recognition device 100 may determine whether or not a word, which is a result of the voice recognition from voice recognition server 50, corresponds to the command. Moreover, in a case where the result of the voice recognition of the input voice in voice recognizer 101 has not corresponded to any target word, voice recognition device 100 may activate a search function that takes, as a search target, the word that is a result of the voice recognition from voice recognition server 50. For example, this search function is a function to acquire information, which is related to the word that is the search target, by accessing an external server (for example, a so-called search engine) on the Internet, and then to display the acquired information on display 140.

In the first exemplary embodiment, the description has been made of the operation example, in which the target word that is "Power On" is taken as an example, and the state where the power-on function is already executed is defined as such a predetermined state where the reject information may be generated. However, for example, immediately after the word that serves as a trigger for receiving the voice is uttered by user 90, voice recognizer 101 does not have to generate the reject information based on the input voice.

In the first exemplary embodiment, the description has been made of the operation example where reject information generator 103 of voice recognition device 100 determines the reject information while taking, as the reject word, the word acquired from voice recognition server 50. However, voice recognition device 100 may determine the reject information under a predetermined condition. For example, voice recognition device 100 may ask user 90 whether or not the word acquired from voice recognition server 50 may be determined as the reject word. For example, voice recognition device 100 may display the word, which is acquired from voice recognition server 50, on display 140, and may determine the word as the reject word based on an input (for example, an input by an operation for a remote controller, voice input or the like) by user 90 for the displayed word. That is to say, voice recognition device 100 may determine the reject information at a time of receiving predetermined input from user 90. FIG. 9 shows an example of display screen in a case where voice recognition device 100 performs such an operation.

FIG. 9 is a diagram schematically showing an example of a display screen in the first exemplary embodiment. In the example shown in FIG. 9, on a screen of display 140, there is displayed message 141 for asking the user whether or not to register a word "xxxx", which is acquired from voice recognition server 50, as the reject word. Then, voice recognition device 100 registers the word "xxxx" as the reject word in a case where "YES" is input from user 90, and does not register the word "xxxx" as the reject word in a case where "NO" is input from user 90. Voice recognition device 100 may perform such an operation.

In the first exemplary embodiment, the description has been made of the operation example where controller 104 of voice recognition device 100 compares the plausibility of the result of the voice recognition of voice recognizer 101 with the threshold values (threshold values S0, S1), and performs processing procedures different from each other between the case where the plausibility exceeds each of the threshold values and a case where the plausibility is equal to or less than the threshold value. However, voice recognition device 100 does not have to use the plausibility. In this case, voice recognizer 101 does not have to specify the plausibility. Alternatively, voice recognizer 101 may perform the voice recognition while defining a fact that the plausibility exceeds the threshold value as one of conditions in the recognition of the target word. In a case where the voice recognition is performed while defining, as the condition, the fact that the plausibility exceeds the threshold value, voice recognizer 101 uses such a condition related to the plausibility in addition to the condition related to the reject information. Hence, for example, when the plausibility does not exceed the threshold value in such a case, voice recognition device 100 may determine that there is no result of the voice recognition.

Moreover, in a case where the input voice has a volume smaller than a fixed level, or the input voice is a sound out of a frequency band utterable by human, then voice recognizer 101 may determine that the voice representing the word is not input (that is, that such voice recognition processing for specifying the corresponding target word is not performed).

The first exemplary embodiment illustrates the example where there are a plurality of the target words (for example, "Power On", "Microphone On" and the like) of the recognition-use information (refer to FIG. 3). However, the target word may be single.

The first exemplary embodiment illustrates the example where the reject information (refer to FIG. 4) includes an item of the target word. However, for example, in such a case where the target word for which the misrecognition of the voice recognition should be prevented is only "Power On", then the item of "Target Word" may be eliminated from the reject information.

The first exemplary embodiment illustrates the example where the reject information includes the reject word and the acoustic feature information of the reject word. However, the reject information just needs to be information for use in specifying the voice that has a possibility to be misrecognized as the target word for which the misrecognition should be prevented. For example, in the state where the input of "Power On" is not awaited with regard to the target word that is "Power On", in the case where voice recognizer 101 misrecognizes the input voice as "Power On", then reject waveform data that is data for specifying a voice waveform of the input voice may be included in the reject information in place of the reject word. In this case, in Step S32 of the voice recognition processing (FIG. 6), voice recognition device 100 may select a target word having a highest degree of likelihood to the input voice regarding the acoustic feature among target words for reject waveform data which is lower in a degree of likelihood to the input voice regarding the voice waveform than a predetermined threshold value. Moreover, in this case, voice recognition device 100 does not have to use voice recognition server 50 in order to generate the reject information. However, such a fact that voice recognition device 100 generates the reject information based on the word as a result of the voice recognition of voice recognition server 50 and based on the acoustic feature of the word can enhance the possibility of preventing the misrecognition in a case where the word prone to be misrecognized as the target word is uttered by user 90 while user 90 is changing voice quality, a voice tone, and the like. Moreover, for this purpose, voice recognition server 50 may use a dictionary in which acoustic features common to a plurality of persons are determined for each of words based on voice quality, voice tones and the like in the plurality of persons.

In the first exemplary embodiment, the description has been made of the operation example where reject information generator 103 acquires, from voice recognition server 50, the word, which is recognized by voice recognition server 50 based on the input voice, and the acoustic feature of the word. However, reject information generator 103 may acquire only the word from voice recognition server 50, and may acquire the acoustic feature, which is based on the word, from a device other than voice recognition server 50.

An execution order (for example, the procedure shown in FIG. 5 to FIG. 8) of the various pieces of processing in voice recognition system 1 shown in the first exemplary embodiment is not limited to the order shown in the first exemplary embodiment. The order of the various pieces of processing may be interchanged with one another within the scope where the spirit of the present disclosure is satisfied. In voice recognition system 1, a voice recognition method just needs to be executed, the voice recognition method including at least: a step of determining whether or not a current state is a predetermined state where a target word should not be recognized in a case where voice recognizer 101 has recognized that an input voice is the target word; and a step of determining reject information based on the input voice in a case where the current state is the predetermined state, and storing the determined reject information in storage 102.

The functional constituents of voice recognition device 100 or voice recognition server 50, which is shown in the first exemplary embodiment, may be placed in individual devices separate from one another. The functional constituents in the separate devices operate in conjunction with one another by communicating with one another by wire or radio, wherein processing substantially the same as the processing performed by voice recognition device 100 or voice recognition server 50, which is shown in the first exemplary embodiment, may be realized.

The functional constituents (functional blocks) of the devices in voice recognition system 1 may be each configured into a single chip by a semiconductor device such as an IC (Integrated Circuit) or an LSI (Large Scale Integrated Circuit), or may collectively configured into a single chip so as to include a part or all of the functional constituents themselves. Moreover, a technique for forming the integrated circuit is not limited to the LSI, and may be realized by a dedicated circuit or a general-purpose processor. There may be used: an FPGA (Field Programmable Gate Array) capable of arbitrarily programming the configuration of the circuit after the LSI is manufactured; and a reconfigurable processor capable of reconfiguring a connection and setting of circuit cells in an inside of the LSI after the LSI is manufactured. Moreover, if a technology for forming the integrated circuit, the technology taking a place of the LSI, appears due to the advancement of the semiconductor technology or another technology derived from the semiconductor technology, then the functional blocks may be integrated by using this technology. A biotechnology may also be applied.

Moreover, all or part the various pieces of processing (for example, the procedures shown in FIG. 5 to FIG. 8) mentioned above may be realized by hardware of the respective devices, or may be realized by using software. Note that the processing by the software is realized in such a manner that processors included in the respective devices execute the control program stored in the memory. Moreover, this control program may be distributed by being recorded in a recording medium. For example, the distributed control program is installed in the devices, and is executed by the processors of the devices, whereby the various pieces of processing (for example, the procedures shown in FIG. 5 to FIG. 8) may be performed in the devices.

As described above, the exemplary embodiments have been described as the illustration of the technology in the present disclosure. For this purpose, the accompanying drawings and the detailed description are provided.

Hence, the constituents described in the detailed description and the accompanying drawings can include not only constituents, which are essential for solving the problems, but also constituents, which are not essential for solving the problems, in order to illustrate the above-described technology. Therefore, it should not be immediately recognized that such inessential constituents are essential by a fact that the inessential constituents are described in the detailed description and the accompanying drawings.

Moreover, the above-mentioned exemplary embodiments illustrate the technology in the present disclosure, and accordingly, can be subjected to various types of alterations, substitutions, additions, omissions and the like within the scope of claims or the scope of equivalents of the claims.

INDUSTRIAL APPLICABILITY

The present disclosure is applicable to a voice recognition system, a voice recognition device, a voice recognition method, and a control program, which performs voice recognition of a voice uttered by a user. Specifically, the present disclosure is applicable to a television receiver, a recording/reproducing device, a computer, a smart phone, a portable terminal, a tablet computer, a game machine, a server device, and the like.

REFERENCE MARKS IN THE DRAWINGS 1 voice recognition system
10 television receiver
40 network
50 voice recognition server
51 voice recognizer
52 storage
90 user
100 voice recognition device
101 voice recognizer
102 storage
103 reject information generator
104 controller
105 output unit
130 microphone
140 display
141 message
150 communicator
160 tuner
170 storage

The invention claimed is:

1. A voice recognition device that recognizes an input voice as a target word, the voice recognition device comprising:
a storage that stores reject information for use in specifying a voice;
a voice recognizer that recognizes the input voice as the target word at least when a degree of likelihood in an acoustic feature between the voice specified by the reject information and the input voice is lower than a predetermined threshold value;
a reject information generator that, in case where the voice recognizer has recognized a given input voice as a given target word based on the acoustic feature in a predetermined state, determines the given input voice as reject information for the given target word, and stores the reject information for the given target word in the storage; and
a controller that executes predetermined control processing in case where the voice recognizer has recognized that the given input voice is the given target word in a state that is not the predetermined state, and does not execute the control processing in case where the voice recognizer has recognized that the given input voice is the given target word in the predetermined state, wherein:
the reject information generator determines, as the reject information for the given target word, information which is related to a voice representing a word recognized without depending on the voice recognizer, based on the given input voice, and
the reject information generator acquires, from an external device, information which is related to a voice representing a word as a result of allowing the external device to perform voice recognition that is based on the given input voice, and determines, as the reject information, an information which is related to a voice representing the word.

2. The voice recognition device according to claim 1, wherein the reject information generator stores the reject information for the given target word in the storage at a time of receiving a predetermined input in case where the voice recognizer has recognized that the given input voice is the given target word in the predetermined state.

3. The voice recognition device according to claim 1, wherein:
the voice recognition device is provided in a television receiver including a microphone and a display,
the control processing is processing for supplying the display with power, and
the predetermined state is a state where the display is supplied with power.

4. The voice recognition device according to claim 1, further comprising
an output unit that outputs, to an outside, the reject information which is stored in the storage.

5. The voice recognition device according to claim 1, wherein a state where input of the given target word is not awaited or a state where the given target word should not be recognized is defined as the predetermined state.

6. The voice recognition device according to claim 1, wherein
the voice recognition device is provided in a television receiver including a microphone and a display, and
a state where the display is supplied with power is defined as the predetermined state in case where the given target word is a word representing an instruction to supply the display with power.

7. A voice recognition system comprising:
a first voice recognition device that recognizes an input voice as a target word; and
a second voice recognition device that recognizes a word corresponding to the input voice,
wherein
the first voice recognition device includes:
a storage that stores reject information for use in specifying a voice;
a first voice recognizer that recognizes the input voice as the target word while defining, as one of conditions, a fact that a degree of likelihood between the voice specified by the reject information and the input voice is lower than a predetermined threshold value; and
a reject information generator that, in case where the first voice recognizer has recognized the input voice as the target word in a predetermined state, transmits the input voice to the second voice recognition device, receives, from the second voice recognition device, information which is related to a voice representing a word recognized by the second voice recognition device, based on the input voice, determines the received information as the reject information, and stores the reject information in the storage, and
the second voice recognition device has a second voice recognizer that recognizes a word, which corresponds to the input voice, based on the input voice received from the first voice recognition device, and that transmits the word to the first voice recognition device.

8. A voice recognition method for use in a voice recognition device including a storage that stores reject information for use in specifying a voice, and a voice recognizer that recognizes an input voice as a target word at least when a degree of likelihood in an acoustic feature between the voice specified by the reject information and the input voice is lower than a predetermined threshold value, the voice recognition method comprising:
determining whether or not the voice recognizer has recognized a given input voice as a given target word in a predetermined state where the given target word should not be recognized;
determining the given input voice as reject information for the given target word and storing the reject information for the given target word in the storage when it is determined that the voice recognizer has recognized that the given input voice is the given target word in the predetermined state; and
executing predetermined control processing in case where the voice recognizer has recognized that the given input voice is the given target word in a state that is not the predetermined state, and not executing the control processing in case where the voice recognizer has recognized that the given input voice is the given target word in the predetermined state, wherein:
information which is related to a voice representing a word recognized without depending on the voice recognizer is determined as the reject information for the given target word is determined, based on the given input voice, and
information which is related to a voice representing a word is acquired from an external device, as a result of allowing the external device to perform voice recognition that is based on the given input voice, and an information which is related to a voice representing the word is determined as the reject information.

9. A non-transitory storage medium storing a control program for allowing a processor of a voice recognition device to execute voice recognition processing, the voice recognition device including a storage that stores reject information for use in specifying a voice, and a voice recognizer that recognizes an input voice as a target word at least when a degree of likelihood in an acoustic feature between the voice specified by the reject information and the input voice is lower than a predetermined threshold value, the voice recognition processing including:
determining whether or not the voice recognizer has recognized a given input voice as a given target word in a predetermined state where the given target word should not be recognized;
determining the given input voice as the reject information for the given target word, and storing the reject information for the given target word in the storage in case where it is determined that the voice recognizer has recognized that the given input voice is the given target word in the predetermined state; and
executing predetermined control processing in case where the voice recognizer has recognized that the given input voice is the given target word in a state that is not the predetermined state, and not executing the control processing in case where the voice recognizer has recognized that the given input voice is the given target word in the predetermined state, wherein:
information which is related to a voice representing a word recognized without depending on the voice recognizer is determined as the reject information for the given target word is determined, based on the given input voice, and
information which is related to a voice representing a word is acquired from an external device, as a result of allowing the external device to perform voice recognition that is based on the given input voice, and an information which is related to a voice representing the word is determined as the reject information.

10. A voice recognition device that recognizes an input voice as a target word, the voice recognition device comprising:
a storage that stores reject information for use in specifying a voice;
a voice recognizer that recognizes the input voice as the target word while defining, as one of conditions, a fact that a degree of likelihood between the voice specified by the reject information and the input voice is lower than a predetermined threshold value;
a reject information generator that, in case where the voice recognizer has recognized the input voice as the target word in a predetermined state, determines the reject information, based on the input voice, and stores the reject information in the storage; and
a controller that executes predetermined control processing in case where the voice recognizer has recognized that the input voice is the target word in a state that is not the predetermined state, and does not execute the control processing in case where the voice recognizer has recognized that the input voice is the target word in the predetermined state, wherein the reject information generator determines, as the reject information, information which is related to a voice representing a word recognized without depending on the voice recognizer, based on the input voice, and the reject information generator acquires, from an external device, information which is related to a voice representing a word as a result of allowing the external device to perform voice recognition that is based on the input voice, and determines, as the reject information, an information which is related to a voice representing the word.

11. A voice recognition method for use in a voice recognition device including a storage that stores reject information for use in specifying a voice, and a voice recognizer that recognizes an input voice as a target word while defining, as one of conditions, a fact that a degree of likelihood between the voice specified by the reject information and the input voice is lower than a predetermined threshold value, the voice recognition method comprising:

determining whether or not the voice recognizer has recognized the input voice as the target word in a predetermined state where the target word should not be recognized;

determining the reject information based on the input voice and storing the reject information in the storage when it is determined that the voice recognizer has recognized that the input voice is the target word in the predetermined state;

executing predetermined control processing in case where the voice recognizer has recognized that the input voice is the target word in a state that is not the predetermined state, and not executing the control processing in case where the voice recognizer has recognized that the input voice is the target word in the predetermined state;

determining, as the reject information, information which is related to a voice representing a word recognized without depending on the voice recognizer, based on the input voice; and acquiring, from an external device, information which is related to a voice representing a word as a result of allowing the external device to perform voice recognition that is based on the input voice, and determining, as the reject information, an information which is related to a voice representing the word.

12. A non-transitory storage medium storing a control program for allowing a processor of a voice recognition device to execute voice recognition processing, the voice recognition device including a storage that stores reject information for use in specifying a voice, and a voice recognizer that recognizes an input voice as a target word while defining, as one of conditions, a fact that a degree of likelihood between the voice specified by the reject information and the input voice is lower than a predetermined threshold value, the voice recognition processing including:

determining whether or not the voice recognizer has recognized the input voice as the target word in a predetermined state where the target word should not be recognized;

determining the reject information, based on the input voice and storing the reject information in the storage in case where it is determined that the voice recognizer has recognized that the input voice is the target word in the predetermined state;

executing predetermined control processing in case where the voice recognizer has recognized that the input voice is the target word in a state that is not the predetermined state, and not executing the control processing in case where the voice recognizer has recognized that the input voice is the target word in the predetermined state;

determining, as the reject information, information which is related to a voice representing a word recognized without depending on the voice recognizer, based on the input voice; and acquiring, from an external device, information which is related to a voice representing a word as a result of allowing the external device to perform voice recognition that is based on the input voice, and determining, as the reject information, an information which is related to a voice representing the word.

* * * * *